US010578011B2

(12) United States Patent
Naruoka et al.

(10) Patent No.: US 10,578,011 B2
(45) Date of Patent: Mar. 3, 2020

(54) MOTIVE-POWER TRANSMISSION DEVICE FOR SUPERCHARGER

(71) Applicant: KAWASAKI JUKOGYO KABUSHIKI KAISHA, Kobe-shi, Hyogo (JP)

(72) Inventors: Shohei Naruoka, Kakogawa (JP); Yoshinobu Tanaka, Hyogo (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 584 days.

(21) Appl. No.: 15/085,866

(22) Filed: Mar. 30, 2016

(65) Prior Publication Data
US 2016/0208684 A1    Jul. 21, 2016

Related U.S. Application Data

(63) Continuation of application No. PCT/JP2013/081037, filed on Nov. 18, 2013.

(51) Int. Cl.
*F02B 39/04* (2006.01)
*F02B 39/14* (2006.01)
(Continued)

(52) U.S. Cl.
CPC ........... *F02B 39/04* (2013.01); *F01D 25/186* (2013.01); *F02B 33/40* (2013.01); *F02B 39/14* (2013.01);
(Continued)

(58) Field of Classification Search
CPC .......... F02B 39/04; F02B 39/14; F02B 33/40; F01D 25/186; F01D 25/34; F16H 1/2863;
(Continued)

(56) References Cited

U.S. PATENT DOCUMENTS 2,900,846 A * 8/1959 Lehman .................. F16H 48/10
475/227
3,825,370 A * 7/1974 McMurtry ............ F04D 29/323
415/129

(Continued)

FOREIGN PATENT DOCUMENTS

JP    03-153470    7/1991
JP    05-045294    6/1993
(Continued)

OTHER PUBLICATIONS

Machine Translation of JP2008031969A.*
(Continued)

*Primary Examiner* — Mark A Laurenzi
*Assistant Examiner* — Loren C Edwards

(57) ABSTRACT

A planetary gear device for a motorcycle transmits a power of a reciprocating combustion engine to a supercharger. The supercharger pressurizes intake air for the combustion engine. The supercharger includes a supercharger rotation shaft and an impeller supported by the supercharger rotation shaft. A planetary gear and an internal gear of the planetary gear device are each composed of a helical gear, and the planetary gear and the internal gear form a helical gear pair. The planetary gear device includes a pressing unit that applies a pressing force in an axial direction to the planetary gear.

11 Claims, 3 Drawing Sheets

(51) Int. Cl.
*F01D 25/18* (2006.01)
*F02B 33/40* (2006.01)
*F16H 1/28* (2006.01)
*F01D 25/34* (2006.01)

(52) U.S. Cl.
CPC ........... *F16H 1/2863* (2013.01); *F01D 25/34* (2013.01); *F05D 2220/40* (2013.01); *F05D 2260/40311* (2013.01)

(58) Field of Classification Search
CPC ................. F16H 57/04; F05D 2220/40; F05D 2260/40311; F04D 29/668
See application file for complete search history.

(56) References Cited

U.S. PATENT DOCUMENTS

| | | | |
|---|---|---|---|
| 5,423,304 | A | 6/1995 | Lawrence et al. |
| 6,478,016 | B1 | 11/2002 | Roderique |
| 7,051,824 | B1 * | 5/2006 | Jones ...................... F02B 33/34 123/559.1 |
| 9,127,591 | B2 | 9/2015 | Arima et al. |
| 2010/0196141 | A1 | 8/2010 | Eybergen et al. |
| 2012/0186565 | A1 | 7/2012 | Arima et al. |

FOREIGN PATENT DOCUMENTS

| | | | | |
|---|---|---|---|---|
| JP | 2007-002919 | | 1/2007 | |
| JP | 2008-031969 | | 2/2008 | |
| JP | 2008031969 | A * | 2/2008 | ............. F02B 33/40 |
| JP | 2013-224676 | | 10/2013 | |
| WO | WO2011/046096 | | 4/2011 | |

OTHER PUBLICATIONS

International Search Report (dated Feb. 4, 2014) for International Patent Application PCT/JP2013/081037, filed Nov. 18, 2013 (4 pages).

English Translation of the International Preliminary Report on Patentability and Written Opinion of the International Searching Authority dated Jun. 2, 2016 for International PCT Patent Application No. PCT/JP2013/081037, filed Nov. 18, 2013 (6 pages).

Extended and Supplementary Search Report dated Apr. 18, 2017 for Corresponding European Patent Application No. 13897370.6 (7 pages).

First Office Action dated Sep. 29, 2017 for Corresponding Chinese Patent Application No. 201380080986.1 with English language translation of the Search Report attached to the Office Action (7 pages).

* cited by examiner

MOTIVE-POWER TRANSMISSION DEVICE FOR SUPERCHARGER

CROSS REFERENCE TO THE RELATED APPLICATION

This application is a continuation application, under 35 U.S.C. § 111(a) of international application No. PCT/JP2013/081037, filed Nov. 18, 2013.

BACKGROUND OF THE INVENTION

Field of the Invention

The present invention relates to a power transmission device, for example, a planetary gear device, for a supercharger mounted to, for example, a reciprocating combustion engine of a motorcycle.

Description of Related Art

A combustion engine mounted on a motorcycle has been known in which a supercharger pressurizes outside air and supplies the pressurized air to the combustion engine (e.g., Patent Document 1). The supercharger is driven in conjunction with rotation of a rotation shaft of the combustion engine, and is connected to the rotation shaft of the combustion engine via a planetary gear device.

RELATED DOCUMENT

Patent Document

[Patent Document 1] WO2011/046096

When the supercharger is rotated, fluctuation in the rotation speed is caused by pulsation of the combustion engine, and meshing and non-meshing of gears are repeated, resulting in noise and vibration.

In view of the above problem, an object of the present invention is to provide a power transmission device for a supercharger, capable of suppressing occurrence of noise and vibration.

SUMMARY OF THE INVENTION

In order to achieve the above object, a power transmission device for a supercharger according to the present invention transmits a power of a reciprocating combustion engine to a supercharger that pressurizes intake air for the combustion engine. The power from the combustion engine is transmitted to the supercharger via a helical gear pair composed of an engine-side helical gear and a supercharger-side helical gear. The supercharger-side helical gear is supported to be movable in an axial direction of a rotation shaft of the supercharger. A pressing unit is provided which applies a pressing force in the axial direction to the supercharger-side helical gear. The "helical gear" includes a double helical gear obtained by combining two helical gears.

According to the above configuration, the supercharger-side helical gear is pressed in the axial direction, whereby meshing of the helical gear pair is maintained. As a result, backlash of the helical gear, which occurs due to torque fluctuation caused by repetition of power strokes of the combustion engine, is suppressed, whereby occurrence of vibration and/or noise is suppressed. In the case of a spur gear, non-meshing of gear teeth cannot be solved even when a force is applied in the axial direction.

In the present invention, preferably, the engine-side helical gear is a ring gear included in a planetary gear mechanism, and the supercharger-side helical gear is a planetary gear included in the planetary gear mechanism. According to this configuration, the planetary gear may be tilted due to unbalance among a reverse suction force in the axial direction that acts on an impeller of the supercharger, an axial load (axial force) that occurs in the helical gear, and a driving power due to intermittent combustion in the combustion engine. However, the pressing unit suppresses fall of the planetary gear, and as a result, occurrence of abnormal noise due to repetition of power strokes of the combustion engine is suppressed.

In the present invention, preferably, an impeller of the supercharger is fixed to the rotation shaft, and the helical gear causes an axial force in a direction counter to a direction of the reverse suction force that acts on the impeller to be generated in the rotation shaft. Since the supercharger rotates at a high speed, a great axial force (reverse suction force) acts on the impeller of the supercharger, and thus, the load capacity of a bearing supporting a rotation shaft of the impeller may be increased. However, according to the above configuration, the axial force of the helical gear and the reverse suction force acting on the impeller are cancelled out each other, and therefore, the axial force can be reduced, resulting in a reduction in the size of the bearing.

When the helical gear generates the axial force in the direction to cancel the reverse suction force, the pressing unit preferably presses the planetary gear in a direction opposite to the reverse suction force. According to this configuration, since the planetary gear is pressed by the pressing unit in the direction opposite to the reverse suction force, the axial force generated in the planetary gear is reduced.

When the planetary gear mechanism is used, preferably, the planetary gear is rotatably supported by a support shaft fixed to a supercharger casing, and a lubrication passage is formed which introduces a lubricating oil from the supercharger casing through the support shaft to a slide portion between the pressing unit and the planetary gear. According to this configuration, since the planetary gear does not revolve around the shaft, it is easy for the pressing unit to press the planetary gear, and moreover, it is easy to form the lubrication passage. In addition, since the slide portion between the pressing unit and the planetary gear is lubricated, abrasion and thermal deterioration of the pressing unit and the planetary gear are avoided.

In the present invention, preferably, the pressing unit is disposed in the vicinity of a support shaft of the supercharger-side helical gear. According to this configuration, since a pressing force of the pressing unit acts in the vicinity of the support shaft, it is possible to suppress tilting of the support shaft, i.e., fall of the supercharger-side helical gear, caused by unbalance of the pressing force in the circumferential direction.

In the present invention, preferably, the pressing unit includes a spring member, and thrust plates that receive a spring force of the spring member and press the supercharger-side helical gear, in which case the supercharger-side helical gear is rotatably supported by a support shaft via a plurality of needle rollers, and a pair of the thrust plates are disposed adjacent to and axially outer sides of the needle rollers. According to this configuration, since the needle rollers are used, fall of the supercharger-side helical gear can be further suppressed. In addition, since the position of the needle rollers in the axial direction is restricted by the thrust plates, a retainer for the needle rollers is dispensed with, whereby the number of components can be reduced.

In the present invention, preferably, the pressing unit includes a spring member and thrust plates that receive a spring force of the spring member and press the supercharger-side helical gear, and the spring member is a disc spring, in which case a circlip that receives a spring force of the disc spring is attached to a support shaft of the supercharger-side helical gear, and the disc spring is compressed between the circlip and a supercharger casing. According to this configuration, the spring member can be compactly configured. In addition, seizure of the spring member, which may occur when the spring member is formed of a rubber member, is avoided.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, a preferred embodiment of the present invention will be described with reference to the drawings. The terms "left side" and "right side" in this specification are the left side and the right side as viewed from a driver on a vehicle.

Figure 1:
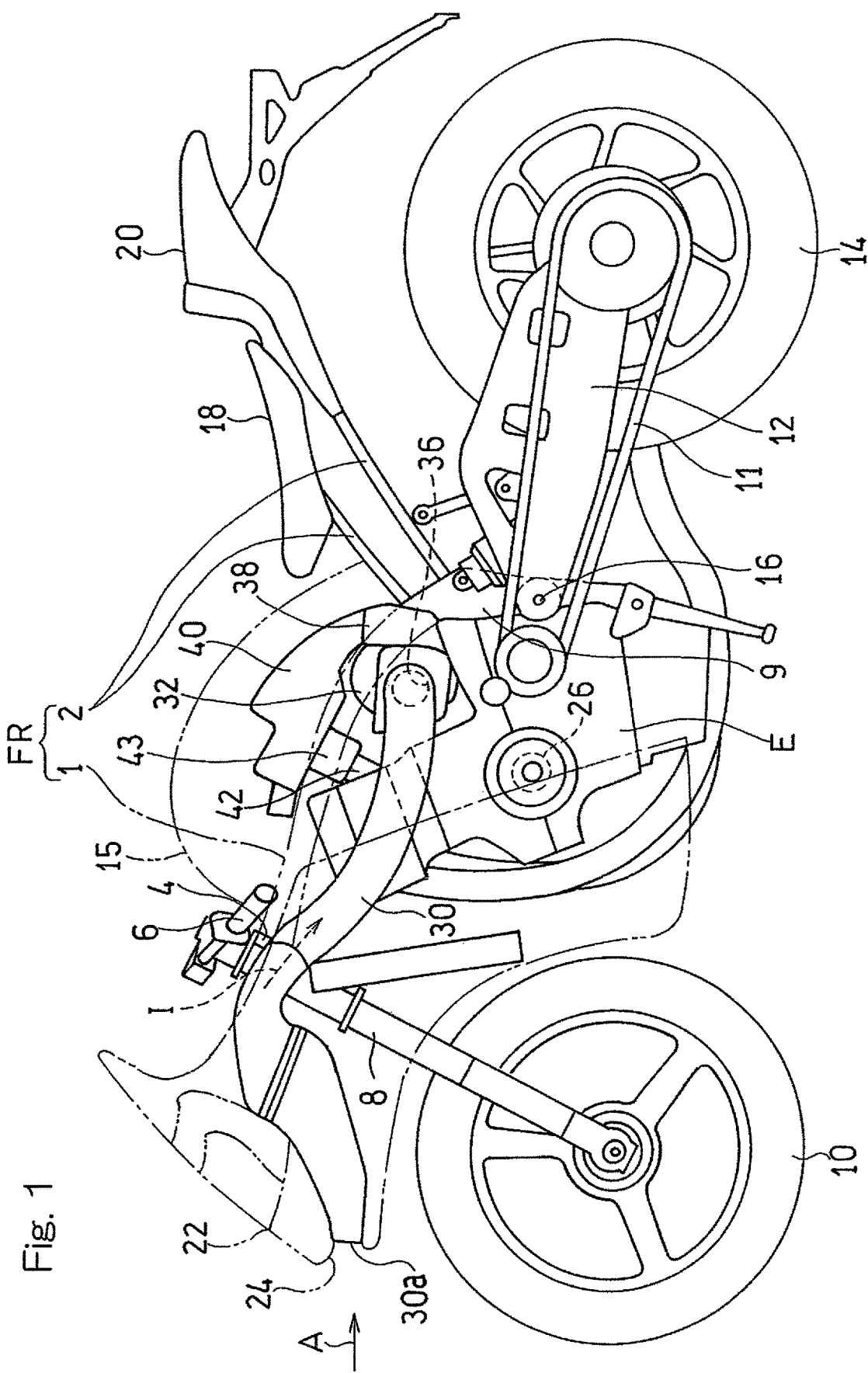
FIG. 1 is a side view showing a motorcycle equipped with a combustion engine including a planetary gear device which is one kind of a power transmission device for a supercharger according to a first preferred embodiment of the present invention.

FIG. 1 is a left side view of a motorcycle equipped with a combustion engine including a planetary gear device which is one kind of a power transmission device for a supercharger according to a first preferred embodiment of the present invention. A motorcycle frame structure FR of the motorcycle includes a main frame 1 which forms a front half of the motorcycle frame structure FR, and a seat rail 2 which forms a rear half of the motorcycle frame structure FR. The seat rail 2 is mounted on a rear portion of the main frame 1. A head pipe 4 is integrated with a front end of the main frame 1, and a front fork 8 is pivotally supported by the head pipe 4 through a steering shaft (not shown). A front wheel 10 is mounted to a lower end portion of the front fork 8. A steering handle 6 is fixed to an upper end portion of the front fork 8.

Meanwhile, a swingarm bracket 9 is provided at a rear end portion of the main frame 1 which is a lower intermediate portion of the motorcycle frame structure FR. A swingarm 12 is supported for swing movement in a vertical direction about a pivot shaft 16 which is mounted to the swingarm bracket 9. A rear wheel 14 is rotatably supported by a rear end portion of the swingarm 12. A combustion engine E, which is a drive source, is mounted to the lower intermediate portion of the motorcycle frame structure FR at the front side of the swingarm bracket 9. This combustion engine E drives the rear wheel 14 through a power transmission mechanism 11 such as a chain. The combustion engine E is a reciprocating combustion engine, for example, a parallel multi-cylinder water-cooled combustion engine having four cylinders with four cycles.

A fuel tank 15 is disposed on an upper portion of the main frame 1, and a driver's seat 18 and a fellow passenger's seat 20 are supported by the seat rail 2. Further, a fairing 22 made of a resinous material is mounted on a front portion of the motorcycle. The fairing 22 covers a portion from front of the head pipe 4 to lateral sides of the front portion of the motorcycle. An air inlet 24 is formed in the fairing 22. The air inlet 24 is located at a front end of the fairing 22, and takes in intake air from the outside to the combustion engine E.

An air intake duct 30 is disposed at the left side of the motorcycle frame structure FR. The air intake duct 30 is supported by the head pipe 4 such that a front end opening 30a thereof faces the air inlet 24 of the fairing 22. The pressure of air introduced through the front end opening 30a of the air intake duct 30 is increased by a ram effect.

A supercharger 32 is disposed rearward of the combustion engine E. The supercharger 32 pressurizes outside air and supplies the pressurized air to the combustion engine E. The air intake duct 30 extends from front of the combustion engine E through the outer left side lateral to the combustion engine E, and is connected to a suction port 36 of the supercharger 32. The air intake duct 30 introduces incoming wind A as the intake air I into the supercharger 32.

An intake air chamber 40 is disposed between a discharge port 38 of the supercharger 32 and an intake port 42 of the combustion engine E, and the discharge port 38 of the supercharger 32 and the intake air chamber 40 are directly connected to each other. The intake air chamber 40 stores high-pressure intake air I supplied from the discharge port 38 of the supercharger 32. The discharge port 38 of the supercharger 32 and the intake air chamber 40 may be connected to each other via a pipe. A throttle body 43 is disposed between the intake air chamber 40 and the intake port 42.

The intake air chamber 40 is disposed above the supercharger 32 and the throttle body 43. The fuel tank 15 is disposed above the intake air chamber 40 and the throttle body 43.

Figure 2:
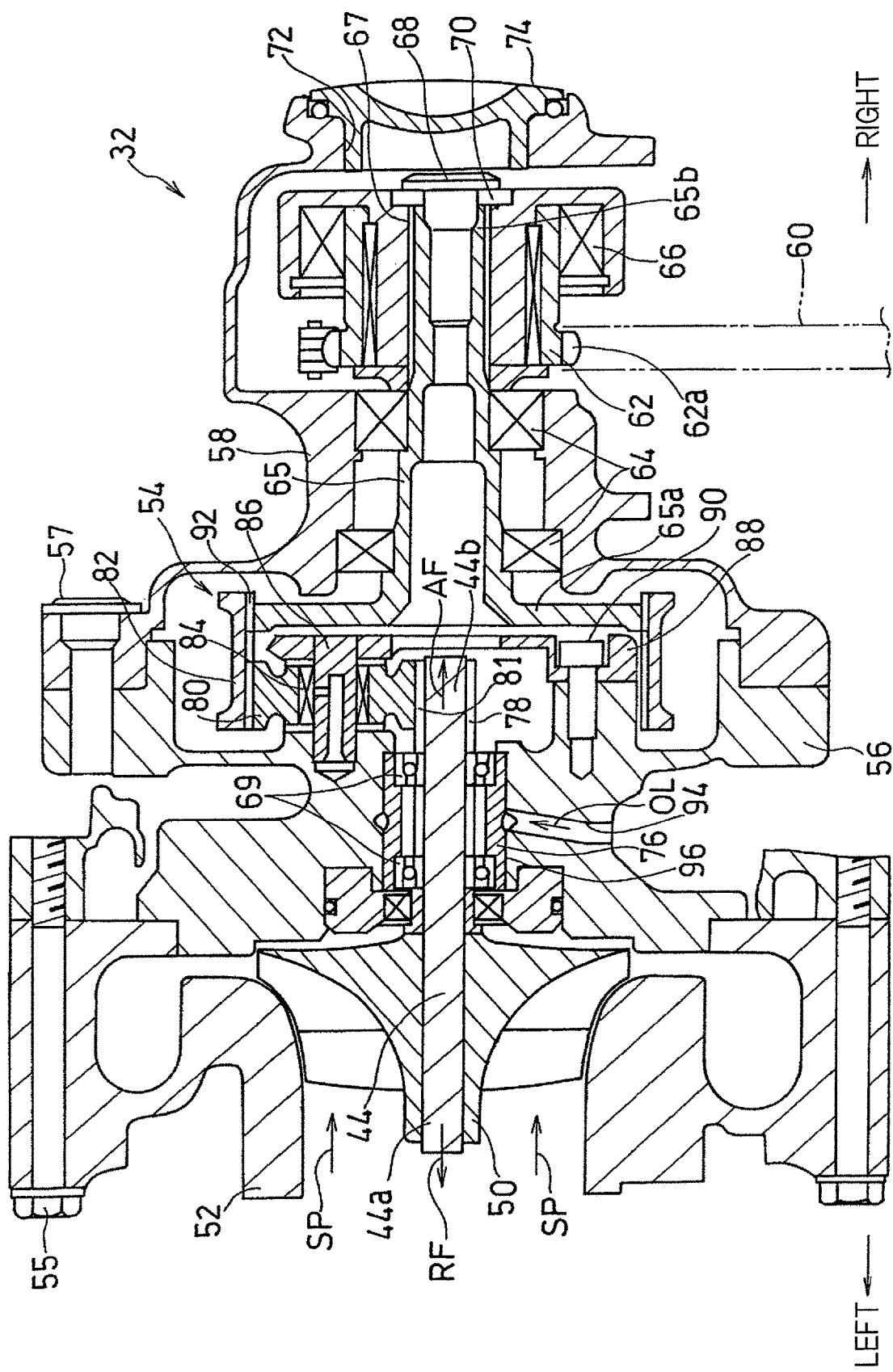
FIG. 2 is a horizontal cross-sectional view showing the supercharger.

As shown in FIG. 2, the supercharger 32 is a centrifugal flow supercharger and includes: a supercharger rotation shaft 44; an impeller 50 which is fixed to a front end portion (left end portion) 44a of the supercharger rotation shaft 44; an impeller housing 52 which covers the impeller 50; a supercharger casing 56 which rotatably supports the supercharger rotation shaft 44; a transmission mechanism 54 which transmits the power of the combustion engine E to the impeller 50; and a transmission mechanism casing 58 which covers the transmission mechanism 54. The supercharger rotation shaft 44 is made of steel. The impeller 50, the impeller housing 52, the supercharger casing 56, and the transmission mechanism casing 58 are formed by aluminum die-casting.

The impeller housing 52 and the supercharger casing 56 are joined to each other by means of bolts 55, and the supercharger casing 56 and the transmission mechanism casing 58 are joined to each other by means of bolts 57. The transmission mechanism 54 forms a power transmission device that transmits the power of the combustion engine E to the supercharger 32. In the present embodiment, a planetary-gear transmission device is used as the transmission mechanism 54.

The supercharger 32 is driven by the power of the combustion engine E. Specifically, the rotational force of a crankshaft 26 (FIG. 1) is transmitted to an input shaft 65, of the transmission mechanism 54, connected to the supercharger rotation shaft 44 via a chain 60 shown in FIG. 2. More specifically, a sprocket 62 is provided on a right end portion of the input shaft 65, and the chain 60 is trained on a gear 62a of the sprocket 62.

The input shaft 65 is a hollow shaft, and is rotatably supported by the transmission mechanism casing 58 via a pair of bearings 64. Spline teeth 67 are formed on an outer circumferential surface of a right end portion 65b which is a front end portion of the input shaft 65, and the sprocket 62 is connected to the input shaft 65 through a one-way clutch 66 that is spline-fitted to this outer circumferential surface. The one-way clutch 66 also serves as a cushioning mechanism that absorbs rotation fluctuation of the power transmitting passage from the combustion engine E to the supercharger 32.

An internal thread portion is formed on an inner peripheral surface of the right end portion 65b of the input shaft 65, and the one-way clutch 66 is mounted on the right end portion 65b through a washer 70 by a head portion of a bolt 68 screwed into this internal thread portion. An opening 72 is formed in a right end portion of the transmission mechanism casing 58 so as to face toward the outside of the motorcycle, and this opening 72 is closed by a cap 74.

A right end portion 44b, which is a base end portion of the rotation shaft 44 of the supercharger 32, is connected to a left end portion 65a, which is a base end portion of the input shaft 65, via the planetary gear device (transmission mechanism) 54. The left end portion 65a of the input shaft 65 is formed as a flange portion 65a. The supercharger rotation shaft 44 is rotatably supported by the supercharger casing 56 via bearings 69.

Two bearings 69 are aligned in the axial direction, and these two bearings 69, 69 are accommodated in a bearing housing 76. On the right end portion 44b of the supercharger rotation shaft 44, external teeth 78 of a helical gear are formed.

The planetary gear device 54 is disposed between the input shaft 65 and the supercharger rotation shaft 44, and is supported by the transmission mechanism casing 58. A plurality of planetary gears 80 are arranged in the circumferential direction and are gear-connected to the external teeth 78 on the right end portion 44b of the supercharger rotation shaft 44. That is, the external teeth 78 of the supercharger rotation shaft 44 function as a sun gear of the planetary gear device 54. On each planetary gear 80, a helical gear 81 which meshes with the sun gear (external teeth) 78 is formed. Three planetary gears 80 are disposed so as to be spaced apart from each other in the circumferential direction.

When the supercharger rotation shaft 44 rotates, a suction force SP is generated in the impeller 50, and a reverse suction force RF of the suction force SP acts on the supercharger rotation shaft 44. The helical gear 81 causes an axial force AF to be generated in the supercharger rotation shaft 44 via the sun gear 78. The axial force AF is directed counter to a direction of the reverse suction force RF so as to cancel the latter RF.

Further, each planetary gear 80 is gear-connected to a large-diameter internal gear (ring gear) 82 at the outer side in the radial direction. That is, the internal gear 82 is also formed as a helical gear. Specifically, the internal gear 82 forms an engine-side helical gear, and each planetary gear 80 forms a supercharger-side helical gear. The internal gear 82 and the planetary gear 80 cooperate together to form a helical gear pair that transmits the power of the combustion engine E to the supercharger 32. The planetary gears 80 are rotatably supported by a carrier shaft 86 through a plurality of bearings 84 mounted on the supercharger casing 56. That is, the carrier shaft 86 forms a support shaft for the planetary gears 80. In the present embodiment, needle rollers are used as the bearings 84.

The carrier shaft 86 is fixed to a fixing member 88, and this fixing member 88 is fixed to the supercharger casing 56 by means of a bolt 90. That is, the carrier shaft 86 is fixed, and the planetary gears 80 do not revolve around the carrier shaft 86. An input gear 92 is provided on the left end portion of the input shaft 65 and is gear-connected to the internal gear 82. In this way, the internal gear 82 is gear-connected to the input shaft 65 so as to integrally rotate in the same rotation direction as the input shaft 65, and the carrier shaft 86 is fixed, whereby the planetary gears 80 rotate in the same rotation direction as the internal gear 82. The sun gear (external gear 78) is formed on the supercharger rotation shaft 44 which is an output shaft, and rotates in a rotation direction opposite to that of the planetary gears 80.

A first lubricating oil passage 94 is formed in the supercharger casing 56. The first lubricating oil passage 94 communicates with a supercharger lubrication passage (not shown) provided outside of the supercharger casing 56 and introduces a lubricating oil to the bearing housing 76. Specifically, an oil layer 96 is formed between the supercharger casing 56 and the bearing housing 76, and the first lubricating oil passage 94 is connected to the oil layer 96. Thus, the bearing housing 76 is supported by the supercharger casing 56 via the oil layer 96 so as to be movable in the radial direction of the supercharger rotation shaft 44. The oil layer 96 has a function of reducing fluctuation of the supercharger rotation shaft 44.

Figure 3:
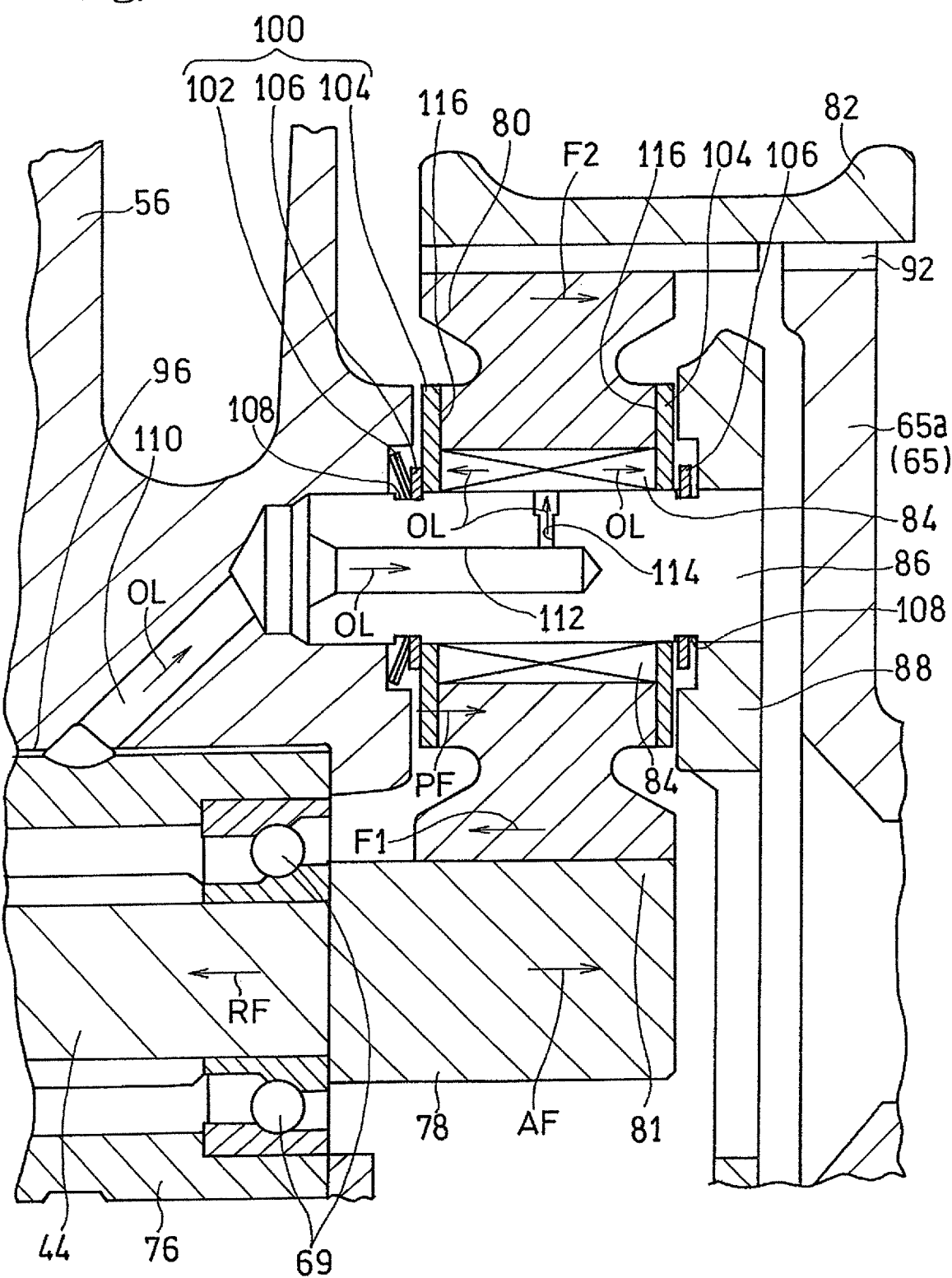
FIG. 3 is a horizontal cross-sectional view showing planetary gears of the supercharger in an enlarged manner.

As shown in FIG. 3, a pair of annular thrust plates 104 are disposed in the vicinity of the axially outer sides of the needle rollers 84 on the carrier shaft 86. The thrust plates 104 are formed of a steel plate member, and are mounted on the carrier shaft 86 so as to be movable in the axial direction of the carrier shaft 86. The thrust plates 104 receive a thrust force (axial force) from the planetary gears 80 and the bearings 84 during operation.

A pair of circumferential grooves 108 are formed, on the opposite outer sides (on the side opposite to the bearings 84) of the thrust plate 104, in the outer circumferential surface of the carrier shaft 86, and a circlip 106 is engaged with each circumferential groove 108. The circlip 106 is formed of a steel plate member, and is mounted so as to be movable in the axial direction in the circumferential groove 108 on the carrier shaft 86.

A spring member 102, which provides a pressing force PF in the axial direction, is interposed between the supercharger casing 56 and each planetary gear 80, specifically, between the supercharger casing 56 and the circlip 106. That is, the spring member 102 is compressed between the circlip 106 and the supercharger casing 56. The spring member 102 is interposed between the supercharger casing 56 and the circlip 106 on the left side of the bearing 84, but is not interposed between the fixing member 88 and the circlip 106 on the right side of the bearing 84.

In the present embodiment, the spring member 102 is composed of two disc springs. However, the spring member 102 may be composed of a single disc spring. Preferably, the spring member 102 is made of metal in terms of durability.

The spring member 102, each thrust plate 104, and each circlip 106 cooperate together to form a pressing unit 100. That is, the pressing unit 100 is interposed between the supercharger casing 56 and each planetary gear 80, and applies the pressing force PF in the axial direction to the planetary gear 80. More specifically, the thrust plate 104 receives the spring force of the spring member 102 via the circlip 106, and presses the planetary gear 80 in the axial direction. The pressing unit 100 presses the planetary gear 80 in a direction (rightward direction) opposite to the reverse suction force RF.

The pressing unit 100 is disposed not on the outer gear side (helical gear 81 side) of the planetary gear 80, but on the carrier shaft 86 side thereof. The pressing unit 100 is provided on each of the three planetary gears 80. In the present embodiment, since each planetary gear 80 does not revolve around the carrier shaft 86, it is easy to provide the pressing unit 100 on the planetary gear 80.

A second lubricating oil passage 110 extending from the oil layer 96 to the carrier shaft 86 is formed in the supercharger casing 56. A third lubricating oil passage 112 is formed within the carrier shaft 86. The third lubricating oil passage 112 is coaxial with the carrier shaft 86 and extends in the axial direction of the carrier shaft 86. An upstream end (left end) of the third lubricating oil passage 112 communicates with a downstream end of the second lubricating oil passage 110. A fourth lubricating oil passage 114 extending in the radial direction of the carrier shaft 86 is formed at a downstream end portion (right end portion) of the third lubricating oil passage 112. A downstream end (radially outer end) of the fourth lubricating oil passage 114 communicates with the bearing 84.

The function of the pressing unit 100 will be described. When the combustion engine E starts up, the rotational force of the crankshaft 26 (FIG. 1) is transmitted to the supercharger rotation shaft 44 through the chain 60 and the planetary gear device 54 shown in FIG. 2.

When the supercharger rotation shaft 44 rotates, the reverse suction force RF relative to the suction force SP acts on the supercharger rotation shaft 44, and the supercharger rotation shaft 44 is pressed leftward. On the other hands, the helical gear 81 of the planetary gear 80 causes the axial force AF in the direction to cancel the reverse suction force RF to be generated in the supercharger rotation shaft 44 via the sun gear 78. Thus, the force in the supercharger rotation shaft 44 toward the left side is suppressed, whereby the axial position of the supercharger rotation shaft 44 is stabilized.

Meanwhile, in a portion, of the planetary gear 80, which meshes with the sun gear 78, a first force F1 in a direction opposite to the axial force AF is generated as shown in FIG. 3. Further, a driving power caused by explosion of the combustion engine E shown in FIG. 1 is transmitted to the planetary gear 80 through the chain 60, the input shaft 65, and the ring gear 82 shown in FIG. 2. Thus, a second force F2 in a direction opposite to the first force F1 shown in FIG. 3 is generated in a portion, of the planetary gear 80, which meshes with the ring gear 82. Then, the planetary gear 80 starts to fall (tilt) due to the first and second forces F1, F2. The thrust plates 104 receive the axial forces F1, F2.

At this time, the pressing unit 100 presses the planetary gear 80 in a direction opposite to the reverse suction force RF and the first force F1. Thereby, the fall (tilting) of the planetary gear 80 is suppressed. Specifically, the spring force (pressing force PF) of the spring member 102 is transmitted to the thrust plate 104 through the circlip 106, and the attitude of the planetary gear 80 is stabilized by balance between the first and second forces F1, F2 and the pressing force PF of the pressing unit 100.

The supercharger casing 56 is formed by aluminum die-casting, and the planetary gear 80, the bearing 84, the carrier shaft 86, the thrust plate 104, and the circlip 106 are made of steel. When the axial force is applied to the planetary gear 80, the planetary gear 80 and the bearing 84 come into contact with the circlip 106 via the thrust plate 104. Since the movement range of the circlip 106 in the axial direction is restricted by the circumferential groove 108, the thrust plate 104 and the circlip 106 are not likely to come into contact with the supercharger casing 56 or the fixing member 88. In this way, during operation, the steel members come into contact with each other, whereas the steel member and the aluminum member do not come into contact with each other.

Further, when the combustion engine E shown in FIG. 1 starts up, a portion of the engine lubricating oil is introduced, as a lubricating oil OL, from the outside of the supercharger casing 56 shown in FIG. 2 into the first lubricating oil passage 94. The lubricating oil OL is supplied to the oil layer 96 and the bearing housing 76. A portion of the lubricating oil OL supplied to the oil layer 96 is introduced to the carrier shaft 86 through the second lubricating oil passage 110 shown in FIG. 3. The lubricating oil OL introduced to the carrier shaft 86 passes through the third lubricating oil passage 112 within the carrier shaft 86, and then is supplied to the bearing 84 through the fourth lubricating oil passage 114. The lubricating oil OL supplied to the bearing 84 flows in the bearing 84 in the axial direction, and is guided to a slide portion 116 between the thrust plate 104 and the planetary gear 80.

In the above-described structure, since the planetary gear 80 shown in FIG. 3 is pressed in the axial direction, meshing between the planetary gear 80 and the internal gear 82 is maintained. As a result, even when torque fluctuation is caused by repetition of power strokes of the combustion engine E, backlash of the helical gear is suppressed, whereby occurrence of vibration and/or noise is suppressed.

Specifically, on the combustion engine side, pulsation which causes the rotation speed to increase occurs due to power strokes of the combustion engine. Meanwhile, on the impeller side (supercharger side), it is attempted to keep the rotation speed constant by inertia. As a result, contact/non-contact of the gear teeth are repeated between the internal gear 82 (the engine-side helical gear) and the planetary gear 80 (the supercharger-side helical gear). This causes repetition of contact and non-contact of the gear teeth also between the planetary gear 80 and the external teeth (sun gear) 78. Since each planetary gear 80 is composed of the helical gear and is subjected to the pressing force in the axial direction by the pressing unit 100, meshing between the planetary gear 80 and the internal gear 82 is prevented from being released. In the case of a spur gear, non-meshing of gear teeth cannot be solved even when a pressing force is applied in the axial direction, and therefore, it is difficult to prevent vibration and/or noise when torque fluctuation occurs.

The planetary gear 80 may be tilted due to an axial load (first force F1) that occurs in the helical gear 81 shown in FIG. 2, and the second force F2 due to the driving power of intermittent explosion of the combustion engine. However, since the pressing unit 100 cancels these forces F1, F2, fall of the planetary gear 80 is suppressed. As a result, occurrence of abnormal noise due to repetition of power strokes of the combustion engine is suppressed.

Since the supercharger 32 rotates at a high speed, a great force in the axial direction (reverse suction force RF) acts on the supercharger rotation shaft 44, and the load capacity of the bearing 69 supporting the supercharger rotation shaft 44 is increased. However, since the helical gear 81 causes the axial force AF in the direction counter to the direction of the reverse suction force RF to be generated in the supercharger rotation shaft 44 via the sun gear 78, the axial force AF of the helical gear 81 and the reverse suction force RF are cancelled out each other. As a result, the bearing 69 can be reduced in size.

Since the helical gear 81 generates the axial force AF in the direction to cancel the reverse suction force RF, the first axial force F1 in the same direction as the reverse suction force RF occurs in the planetary gear 80. However, since the pressing unit 100 presses the planetary gear 80 in the direction opposite to the reverse suction force RF, the first force F1 generated in the planetary gear 80 can be reduced.

Since the pressing unit 100 is disposed in the vicinity of the carrier shaft 86 for the planetary gear 80 and the pressing force PF due to the pressing unit 100 acts in the vicinity of the carrier shaft 86, it is possible to suppress tilting of the carrier shaft 86, i.e., fall of the planetary gear 80, caused by unbalance of the pressing force PF in the circumferential direction. In addition, mounting of the pressing unit 100 is facilitated as compared to the case where the pressing unit 100 is disposed on the outer circumferential side of the gear. Moreover, since the spring member 102 is interposed only between the supercharger casing 56 and the circlip 106, assemblability is improved. Further, since the spring member 102 is interposed only between the supercharger casing 56 and the circlip 106, assembly is simplified, and compact housing is achieved.

Since the planetary gears 80 are rotatably supported by the carrier shaft 86 via the plurality of needle rollers 84, fall of the planetary gears 80 can be further suppressed. Further, since the position of the needle rollers 84 in the axial direction is restricted by the thrust plates 104 and the circlips 106, a retainer for the needle rollers 84 is dispensed with, whereby the number of components can be reduced.

Since the planetary gears 80 do not revolve around the carrier shaft 86, it is easy for the pressing unit 100 to press the planetary gears 80, and moreover, it is easy to form the second lubricating oil passage 110. Further, since the slide portion 116 between the pressing unit 100 and each planetary gear 80 is lubricated, abrasion and thermal deterioration of the pressing unit 100 and the planetary gear 80 are avoided.

Since the spring member 102 is composed of a disc spring and the disc spring 102 is compressed between the circlip 106 and the supercharger casing 56, the spring member 102 can be compactly configured.

The helical gear pair and the pressing unit 100 are provided between each planetary gear 80 and the internal gear 82 which form a power transmitting portion having a high gear ratio. Thus, vibration and/or noise during engine pulsation can be effectively suppressed.

The present invention is not limited to the embodiment described above, and various additions, modifications, or deletions may be made without departing from the gist of the invention. For example, although the spring member 102 is a disc spring in the above preferred embodiment, a spring member other than a disc spring may be adopted. In addition, although the spring member 102 is interposed only between the supercharger casing 56 and the circlip 106 in the above preferred embodiment, the spring member 102 may also be interposed between the fixing member 88 and the circlip 106.

A member having spring property other than the circlip 106 may be used as the pressing unit 100. Instead of using a member having spring property as the pressing unit 100, for example, hydraulic pressure may be supplied from a hydraulic source to cause a pressing element to generate a pressing power in the axial direction.

Preferably, the supercharger side helical gear is provided at a position in the vicinity of the impeller in the power transmitting passage from the combustion engine to the supercharger. Specifically, the supercharger side helical gear is preferably provided on the impeller side relative to the cushioning mechanism that absorbs rotation fluctuation, in the power transmitting passage. A power transmission device other than the planetary gear device may be provided with a helical gear pair and a pressing unit. Further, the power transmission device for the supercharger according to the present invention is also applicable to combustion engines for vehicles other than motorcycles, water crafts and the like, and furthermore, to combustion engines installed on the ground. Therefore, these are construed as included within the scope of the present invention.

REFERENCE NUMERALS

32 . . . supercharger
44 . . . supercharger rotation shaft (rotation shaft)
50 . . . impeller
54 . . . planetary gear device (power transmission device)
56 . . . supercharger casing
80 . . . planetary gear (supercharger-side helical gear)
82 . . . internal gear (ring gear, engine-side helical gear)
84 . . . bearing (needle roller)
86 . . . carrier shaft (planetary gear support shaft)
100 . . . pressing unit
102 . . . spring member (disc spring)
104 . . . thrust plate
106 . . . circlip
116 . . . slide portion
AF . . . axial force
E . . . combustion engine
RF . . . reverse suction force

What is claimed is:

1. A power transmission device for a supercharger, the power transmission device transmitting a rotational power of a crankshaft of a reciprocating combustion engine to the supercharger that pressurizes intake air for the combustion engine, the combustion engine being mounted on a motorcycle, wherein power from the combustion engine is transmitted to the supercharger via a helical gear pair composed of an engine-side helical gear and a supercharger-side helical gear, the supercharger-side helical gear is supported to be movable in an axial direction of a rotation shaft of the supercharger, a pressing unit applies a pressing force in the axial direction to the supercharger-side helical gear, with a thrust plate and a circlip, the engine-side helical gear is a ring gear included in a planetary gear mechanism, the supercharger-side helical gear is a plurality of planetary gears included in the planetary gear mechanism, the planetary gears transmit the power to the rotation shaft to which an impeller of the supercharger is fixed, the planetary gears are rotatably supported by a support shaft fixed to a supercharger casing, and the supercharger-side helical gear causes an axial force in a direction counter to a direction of a reverse suction force that acts on the impeller to be generated in the rotation shaft.

2. The power transmission device for the supercharger as claimed in claim 1, wherein the pressing unit presses the supercharger-side helical gear in a direction opposite to the reverse suction force.

3. The power transmission device for the supercharger as claimed in claim 1, wherein a lubrication passage is formed which introduces a lubricating oil from the supercharger casing through the support shaft to a slide portion between the pressing unit and the planetary gears.

4. The power transmission device for the supercharger as claimed in claim 1, wherein the pressing unit is disposed within boundaries of the supercharger casing.

5. The power transmission device for the supercharger as claimed in claim 4, wherein:

the pressing unit is configured to apply a pressing force counter to the impeller in the axial direction to the planetary gears.

6. The power transmission device for the supercharger as claimed in claim 1, wherein the pressing unit includes a spring member, and thrust plates that receive a spring force of the spring member and press the supercharger-side helical gear, the supercharger-side helical gear is rotatably supported by the support shaft via a plurality of needle rollers, and a pair of the thrust plates are disposed adjacent to axially outer sides of the needle rollers.

7. The power transmission device for the supercharger as claimed in claim 1, wherein: the pressing unit includes a spring member, and the thrust plates that receive a spring force of the spring member and press the supercharger-side helical gear;

the spring member includes a disc spring;

a circlip that receives a spring force of the disc spring is attached to the support shaft; and the disc spring is compressed between the circlip and the supercharger casing.

8. The power transmission device for the supercharger as claimed in claim 1, wherein the pressing unit includes a spring member interposed between the planetary gears and the supercharger casing, and the spring member is configured to press the planetary gears against the supercharger casing.

9. The power transmission device for the supercharger as claimed in claim 8, wherein:

the planetary gears are rotatably supported by the support shaft through a plurality of bearings mounted on the supercharger casing; and the spring member is interposed between the planetary gears and the supercharger casing on an impeller side of the bearing, and is not interposed between the planetary gears and the supercharger casing on a side of the support shaft fixed to the supercharger casing.

10. A motorcycle comprising:

a reciprocating combustion engine;

a supercharger that pressurizes intake air for the combustion engine; and a power transmission device for the supercharger, the power transmission device transmitting a rotational power of a crankshaft of the reciprocating combustion engine to the supercharger, wherein power from the combustion engine is transmitted to the supercharger via a helical gear pair composed of an engine-side helical gear and a supercharger-side helical gear, the supercharger-side helical gear is supported by a shaft and movable in an axial direction of a rotational shaft of the supercharger, a pressing unit is provided which applies a pressing force in the axial direction to the supercharger-side helical gear, the engine-side helical gear is a ring gear included in a planetary gear mechanism, the supercharger-side helical gear is a plurality of planetary gears included in the planetary gear mechanism, the planetary gears transmit the power to the rotational shaft to which an impeller of the supercharger is fixed, the planetary gears are rotatably supported by a support shaft fixed to a supercharger casing, and the supercharger-side helical gear causes an axial force in a direction counter to a direction of a reverse suction force that acts on the impeller to be generated in the rotational shaft.

11. The motorcycle of claim 10 wherein the support shaft is fixed to a supercharger casing which includes a lubrication passage formed through the support shaft to provide lubricating oil from the supercharger casing to a slide portion between the pressing unit and the planetary gears and the planetary gears are rotatably supported by a plurality of needle roller bearings on the supercharger casing.

* * * * *